June 28, 1938.   D. H. BITNEY   2,122,275
CAMP STOVE
Filed Nov. 16, 1936
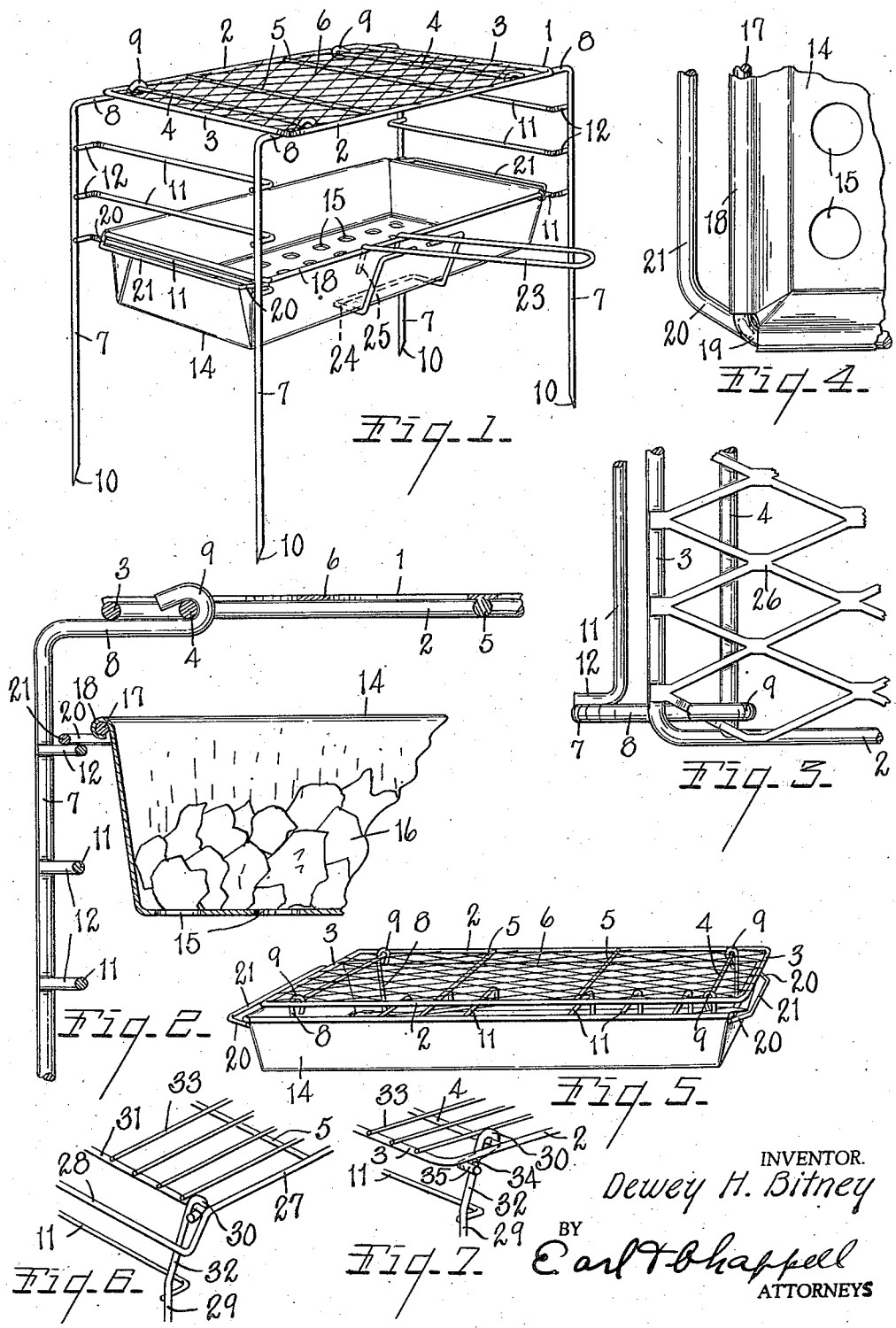
INVENTOR.
Dewey H. Bitney
BY Earl Chappell
ATTORNEYS Patented June 28, 1938

2,122,275

UNITED STATES PATENT OFFICE 2,122,275

CAMP STOVE

Dewey H. Bitney, Albion, Mich., assignor to Union Steel Products Company, Albion, Mich.

Application November 16, 1936, Serial No. 111,075

9 Claims. (Cl. 126—30)

The main objects of this invention are:

First, to provide an improved collapsible stove which is convenient to use, may be very compactly collapsed and quickly set up, and one which is very secure and rigid when set up or erected.

Second, to provide a camp stove which has these advantages and at the same time one which is very efficient in use.

Third, to provide a structure having these advantages which is very economical.

Objects pertaining to details and economies of my invention will definitely appear from the description to follow. The invention is defined in the claims.

A structure which embodies the features of my invention is clearly illustrated in the accompanying drawing, in which:

Fig. 1 is a perspective view of my camp stove in erected position, the fire pot or fire pan being in its lowest position.

Fig. 2 is an enlarged detail in longitudinal section.

Fig. 3 is an enlarged fragmentary plan view.

Fig. 4 is a fragmentary inverted view of the firepot.

Fig. 5 is a perspective view of the stove collapsed and assembled for storage or packaging.

Fig. 6 is a fragmentary perspective view of a modified form or embodiment of my invention, particularly in the matter of attachment of legs to the top grid.

Fig. 7 is a fragmentary perspective view of still another modified form or embodiment of my invention.

My invention as illustrated in the accompanying drawing comprises a top grid designated generally by the numeral 1, this top grid having an endless wire border frame comprising side members 2, 2 and end members 3, 3. Cross pieces 4, 4 are provided disposed adjacent to but substantially spaced from the end piece 3 and intermediate cross pieces 5. The wire slats or network 6 are arranged to provide a suitable grill.

The legs 7 are provided with inwardly projecting arms 8 at their upper ends terminating in upturned eyes 9 embracing the transverse members 4 for pivotally connecting the legs to the top. When the legs are erected the end members 3 of the frame rest upon these arms as is clearly shown in the drawing. The legs are formed of rod or heavy wire and are preferably sharpened at their lower ends as indicated at 10 so that they may be inserted into the ground a short distance to prevent the structure sliding about and also to assist in holding the legs in erected position. The pairs of legs are connected by the combined cross pieces and firepot supporting rails 11 which have outwardly turned ends 12 welded upon the inner sides of the legs. These cross pieces 10 are arranged in opposed pairs and constitute supporting rails or ledges for the firepot 14.

This firepot is preferably pan-like in form having a plurality of holes 15 in its bottom. Fuel is indicated at 16 in Fig. 2. This firepot has its edges reinforced by the bead wire 17, the upper edges of the walls of the firepot being beaded around this bead wire as shown at 18. The bead wire has exposed portions 19 at the corners of the pan and to these exposed portions I weld the inwardly projecting arms 20 of the supporting rods 21. These supporting rods are adapted to slightly engage the ledges or supporting rails on the legs as shown in Figs. 1 and 2.

A detachable handle 23 is provided having a jaw 24 adapted to engage the bottom of the pan and jaws 25 adapted to engage over the rim of the fire pan. By means of the detachable handle the fire pan may be selectively engaged with its supporting rails; further, it is sometimes desirable to start the fire in the firepot and when the fire reaches the desired condition and it is desired to begin the cooking, the firepot may be picked up by means of the handle and placed on the desired supports. Sometimes it is desirable to shift it during a cooking operation, in broiling steak for instance, as the judgment of the cook, the condition of the fire, and the article being cooked may dictate.

In Fig. 3 the grill 26 is formed of expanded metal. The parts are preferably proportioned so that when the legs are collapsed they may be nested within the firepot as shown in Fig. 5.

In the embodiment of my invention shown in Fig. 6 the border or frame wire 27 of the grid has downwardly offset end members 28. The legs 29 terminate in eyes 30 pivotally mounted on the cross members 31 corresponding to the cross members 4 of the embodiment described. The legs have angled upper end portions 32 corresponding to the laterally disposed arms 8. When the legs are erected these angled end portions of the grid frame provide stops for the legs limiting their outward swing and supporting them in their erected positions when the legs are engaged in the ground.

In the modification of my invention shown in Fig. 7 the border frame is the same as that shown in the first described embodiment. Slats 33 are provided in the embodiments of both Figs. 6 and 7 instead of the expanded metal grill. In this embodiment of Fig. 7 the legs 29 are angled at 32 as in the embodiment of Fig. 6 but the eyes 30 of the legs are extended into arms 34 having laterally turned stops 35 engaging with the frame when the legs are erected. In all of these embodiments the legs and frame are provided with coacting engaging portions or stops which support the legs in erected position.

I have illustrated and described my invention in very practical embodiments. I have not attempted to illustrate or describe certain other modifications or adaptations which I contemplate as it is believed that this disclosure will enable those skilled in the art to embody or adapt my invention as may be desired.

Having thus described my invention what I claim as new and desire to secure by Letters Patent is:

1. In a camp stove, the combination of a top grid comprising a border frame having side and end members and transverse members disposed in spaced relation to the end members, pairs of legs having integrally extending arms at their upper ends terminating in upturned eyes pivotally engaging said transverse members at the inside of the side members of the frame so that when the legs are swung to erected position the end members of the border frame rest upon the arms of the legs, combined cross pieces and firepot supporting rails having outwardly projecting arms at their ends welded to said pairs of legs in opposed pairs, a sheet metal pan-like fire pot having a foraminated bottom and provided with a reinforcing bead wire at the top of the side walls, said bead wire being exposed at the corners of the fire pot, and supporting rods having inturned arms at their ends welded to the exposed bead wire, said supports being selectively engageable with said supporting rails.

2. In a camp stove, the combination of a top grid comprising a border frame having side and end members and transverse members disposed in spaced relation to the end members, pairs of legs having laterally extending arms at their upper ends terminating in upturned eyes pivotally engaging said transverse members at the inside of the side members of the frame so that when the legs are swung to erected position the end members of the border frame rest upon the arms of the legs, combined cross pieces and firepot supporting rails having outwardly projecting arms at their ends welded to said pairs of legs in opposed pairs selectively engageable with said supporting rails.

3. In a camp stove, the combination of a top grid comprising a border frame having side and end members and transverse members disposed in spaced relation to the end members, pairs of legs having laterally extending arms at their upper ends pivotally engaging said transverse members at the inside of the side members of the frame so that when the legs are swung to erected position the end members of the border frame rest upon the arms of the legs, combined cross pieces and firepot supporting rails secured to said pairs of legs in opposed pairs, a sheet metal pan like fire pot having a foraminated bottom and provided with a reinforcing bead wire at the top of the side walls, said bead wire being exposed at the corners of the firepot, and supporting rods having inturned arms at their ends welded to the exposed bead wire, said supports being selectively engageable with said supporting rails.

4. In a camp stove, the combination of a top grid comprising a border frame having side and end members and transverse members disposed in spaced relation to the end members, pairs of legs having laterally extending arms at their upper ends pivotally engaging said transverse members at the inside of the side members of the frame so that when the legs are swung to erected position the end members of the border frame rest upon the arms of the legs, combined cross pieces and firepot supporting rails secured to said pairs of legs in opposed pairs, and a firepot selectively engageable with said supporting rails.

5. In a camp stove, the combination of a top grid comprising a border frame having side and end members and transverse members disposed in spaced relation to the end members, pairs of legs having laterally extending arms at their upper ends pivotally engaging said transverse members at the inside of the side members of the frame so that when the legs are swung to erected position the end members of the border frame rest upon the arms of the legs, firepot supporting rails secured to said pairs of legs in opposed pairs, and supporting rods having inturned arms at their ends secured to the firepot, said supporting rods being selectively engageable with said supporting rails.

6. In a camp stove, the combination of a top grid comprising a border frame having side and end members and transverse members disposed in spaced relation to the end members, pairs of legs angled at their upper ends pivotally engaging said transverse members at the inside of the side members of the frame so that when the legs are swung to erected position the end members of the border frame rest upon the angled ends of the legs, firepot supporting rails secured to said pairs of legs in opposed pairs, and a firepot selectively engageable with said supporting rails.

7. In a camp stove, the combination of a top grid, pairs of legs angled at their upper ends pivotally connected to said top grid so that when the legs are swung to erected position the grid rests upon the angled ends of the legs, the legs being collapsible into approximately parallel relation to the grid, firepot supporting rails secured to said legs in opposed pairs, a sheet metal pan-like firepot having a foraminated bottom and provided with a reinforcing bead wire at the top of the side walls, said bead wire being exposed at the corners of the firepot, and supporting rods having inturned arms at their ends welded to the exposed bead wire, said supports being selectively engageable with said supporting rails.

8. In a camp stove, the combination of a top grid, pairs of legs angled at their upper ends pivotally connected to said top grid so that when the legs are swung to erected position the grid rests upon the angled ends of the legs, the legs being collapsible into approximately parallel relation to the grid, firepot supporting rails secured to said legs in opposed pairs, and a firepot selectively engageable with said supporting rails.

9. In a camp stove the combination with a top grid comprising a border frame having side and end members and transverse members disposed in spaced relation to the end members, and pairs of legs angled at their upper ends pivotally engaged with said transverse members so that when the legs are swung to erected position the end members of the grid rest upon the angled ends of the legs for supporting the grid and limiting the outward swing of the legs.

DEWEY H. BITNEY.